March 10, 1964 H. R. BURNS, JR 3,124,700

NON-COINCIDENCE MAGNETIC GATE

Filed Aug. 10, 1960

INVENTOR
HERBERT R. BURNS JR.

BY George Baron
ATTORNEY

United States Patent Office 3,124,700

Patented Mar. 10, 1964

3,124,700

NON-COINCIDENCE MAGNETIC GATE

Herbert R. Burns, Jr., Woodstock, N.Y., assignor to International Business Machines Corporation, New York, N.Y., a corporation of New York Filed Aug. 10, 1960, Ser. No. 48,632

5 Claims. (Cl. 307—88)

This invention relates to storage systems, and particularly to magnetic storage systems for storing and performing logic on binary information.

It is well known in the art that materials having a substantially rectangular hysteresis loop can be used with great advantage for storing binary information. Such materials have two stable states of remanence, wherein one stable state will represent the storage of a binary "1" and the other state the storage of a binary "0." It is also well known that the stored information must be transmitted from one core to another core, or to a plurality of cores, in carrying out logical operations and/or computations. During such transfer of binary information from one core to another or in the carrying out of logical operations requiring the switching of a bistable core from one state to its other state, there may be a number of windings on the switched core that are cut by lines of flux. Currents will be induced in windings that are cut by such flux lines and these induced currents, unless blocked, will affect other cores or active elements in the path of such induced currents.

In order to block the above noted induced currents, diodes are normally inserted in the circuit that includes the winding through which the induced currents flow. Another manner in which such induced currents are blocked is to employ inhibit current in a second winding on a core so that undesired induced current flowing in a first winding on such core can be bucked out or cancelled. Another technique to cancel undesired magnetomotive flux created by currents being applied to windings on a core is to employ delay circuits that will delay the appearance of such currents in the windings so as to nullify the effects of such currents when they actually arrive at a core winding.

The present invention deals with a logical circuit employing bistable magnetic cores wherein binary information is received as an input pulse to the circuit, the latter storing such information to be gated on demand. The gating circuit will not require diodes, delay circuits, nor inhibit windings.

The basic logic circuit comprises two bistable square-looped magnetic cores. Each core has wound about it a set winding, a reset winding and an output winding. The corresponding windings are serially connected, e.g., the set winding of the first core is serially connected to the set winding of the second core, the reset winding of the first core in series with the reset winding of the second core, etc. A pulse on the set winding will set both cores to a first stable state, such as to store a binary "1" in each core. A pulse on the reset winding will switch both cores to their respective "0" states. The output windings are connected in opposition so that should each core contain a "1" before a pulse is applied to their common reset winding, the output currents produced in such output windings during resetting will cancel each other. If only the first core contains a "1," a reset pulse will gate out the "1" in such first core, since the absence of a "1" in the second core will prevent the cancellation of an output signal from the switched first core.

The first core has an additional winding not found on the second core, such additional winding serving to receive sampling pulses, which pulses tend to switch the first core toward the same stable state as a pulse appearing on the reset winding on the same core. The sampling pulse serves to yield an output signal from the first core when the latter is in its "1" state regardless of the stable state of the second core, whereas a reset pulse will produce an output pulse upon the switching of the first core from its "1" state to its "0" state dependent upon the state of the second core. Consequently the appearance of an output signal when a sampling pulse is applied yields different significant information about the states of the two cores than the appearance of an output signal when a reset pulse is applied. The output circuit provided produces a positive voltage signal when the first core is switched from its "1" state to its "0" state but produces a negative pulse when the second core is switched from its "1" state to its "0" state.

A further embodiment of the invention employs a third core, to be described in greater detail hereinafter, in conjunction with the first two cores such that a positive output pulse always appears on the output winding associated with the first core when only the latter switches from its "1" state to its "0" state whereas an output winding on the third core produces a negative output pulse when only said first core switches from its "1" state to its "0" state. In certain logical operations, it is desirable to produce both a positive as well as a negative output signal along two different lines when a bistable core is switched from a preselected first state to its second state and the present invention provides for such operation.

Consequently it is an object of this invention to provide improved logical circuitry employing bistable magnetic cores.

It is another object to provide a diodeless transfer circuit employing magnetic cores.

Yet another object is to employ cores in a gating circuit so that both a positive pulse and a negative pulse can be produced when a core is in a first predetermined stable condition, but no output pulse is produced when such core is in its other stable condition.

The foregoing and other objects, features and advantages of the invention will be apparent from the following more particular description of preferred embodiments of the invention, as illustrated in the accompanying drawings.

Figure 1:
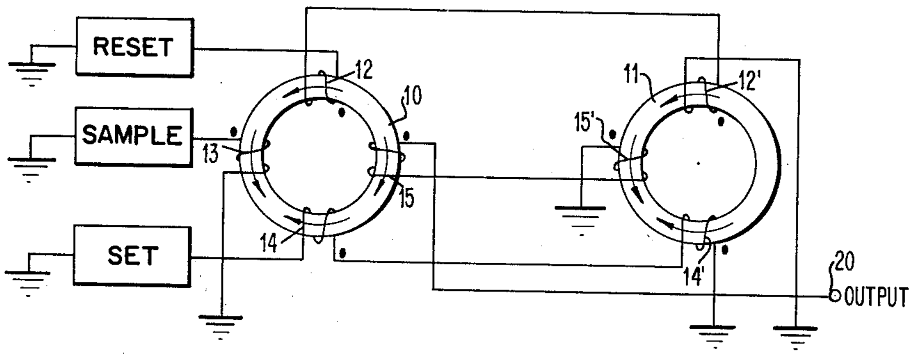
FIG. 1 is a first embodiment of the invention using two cores.

Turning to FIG. 1, there are shown two bi-stable magnetic cores 10 and 11 having substantially rectangular hysteresis loop characteristics, each core having wound thereon a reset winding 12 and 12', a set winding 14 and 14', and an output winding 15 and 15'. The pulses applied to the reset windings 12 and 12' will drive the cores 10 and 11 toward their respective "0" states and, upon the termination of such pulses, the cores will be magnetized in a counterclockwise direction and reside in their respective negative remanent states. The pulses applied to set windings 14 and 14' will drive cores 10 and 11 toward their respective "1" states and, upon the termination of such pulses, such cores will reside in their respective positive remanent states and be magnetized in a clockwise direction.

Whenever either core 10 or 11 switches from one remanent state to its other remanent state, lines of flux cut across the output winding 15 or 15' associated with the switching core, producing an output signal pulse at terminal 20. If only core 10 is being switched, a switching of the latter from its "0" state to its "1" state will produce a negative pulse at output terminal 20 whereas a switching of such core from its "1" state to its "0" state will produce a positive pulse at output terminal 20.

The opposite polarities are produced when core 11 switches, namely, a positive pulse appearing at output terminal 20 when core 11 switches from its "0" state to its "1" state but a negative pulse when core 11 switches from its "1" state to its "0" state. These opposite polarities arise because output windings 15 and 15' are wound in bucking or opposing relationship. Thus if both cores 10 and 11 are each simultaneously switched from their respective "1" states to their "0" states, the signals appearing on output windings 15 and 15' oppose each other and cause cancellation, so that cores 10 and 11 switch without producing an output pulse of either polarity at terminal 20.

Whenever core 10 has been set to its "1" state, a sampling pulse appearing at input terminal 13 will reset core 10 and produce a positive output pulse at terminal 20 regardless of the state of core 11. Thus, only when a set pulse is followed by a sampling pulse does a positive pulse appear at terminal 20. Also, only when core 11 is in the "1" state and core 10 in the "0" state does a reset pulse applied to both cores produce a negative pulse at output terminal 20. The novel circuit of FIG. 1 performs the "exclusive-OR" function in that no output signal appears at terminal 20 if both cores 10 and 11 are in the same remanent state, e.g., both are storing "0's" or "1's." A pulse appears at output terminal 20 only if cores 10 and 11 are in different remanent states. Additional information is obtained by the fact that a positive pulse appearing at terminal 20 indicates that core 10 alone was reset and a negative pulse appearing at such terminal indicates that core 11 alone was reset.

Figure 2:
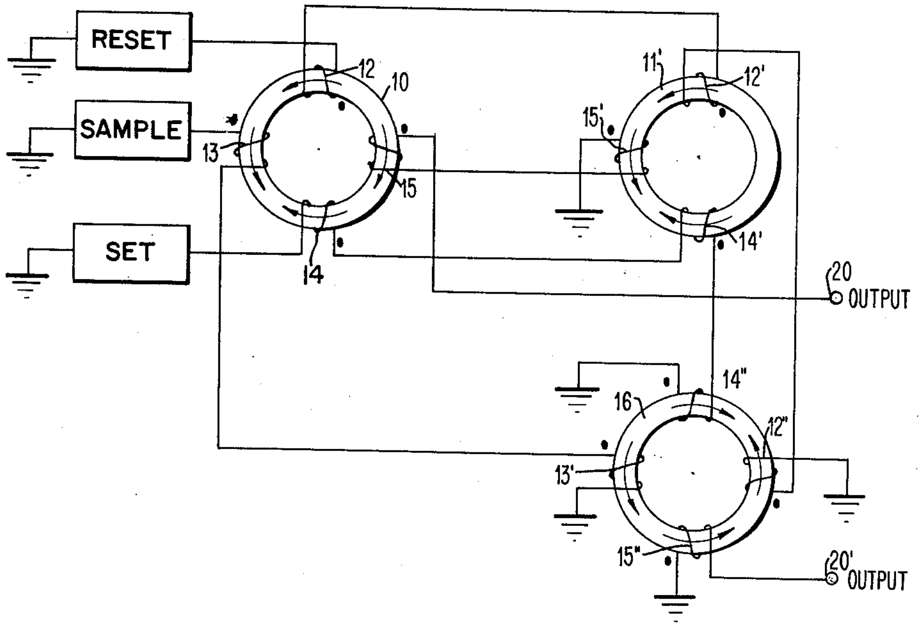
FIG. 2 is a modification of the invention using three cores.

In certain computer operations, it is desirable to obtain both a positive voltage signal as well as a negative voltage signal when core 11 has been first set by a pulse appearing at input winding 14 followed by a sampling pulse appearing at input winding 13 that switches core 10 to its negative remanent state. Such simultaneous appearance of a negative as well as a positive pulse during the resetting of core 10 is obtained by adding a third core 16 to the logic circuit of FIG. 1. Core 16 contains the same corresponding windings as core 10, namely, sampling winding 13', reset winding 12'', set winding 14'' and output winding 15'', save that the latter winding 15'' is wound about core 16 opposite to the manner in which winding 15 is placed on core 10. Consequently when core 10 is reset by a sampling pulse, a positive output pulse appears at terminal 20 but a negative output pulse appears at terminal 20'. The embodiment of FIG. 2 permits the "exclusive-OR" function to be carried out but also provides a positive as well as a negative signal to be generated whenever the "exclusive-OR" function is carried out.

The foregoing logic circuit is a simple, rugged, yet reliable system for gating pulses or carrying out the "exclusive-OR" function without requiring diodes nor inhibit driver circuits.

While the invention has been particularly shown and described with reference to preferred embodiments thereof, it will be understood by those skilled in the art that various changes in form and details may be made therein without departing from the spirit and scope of the invention.

What is claimed is:

1. A logic circuit comprising a pair of bistable magnetic cores having substantially square hysteresis loop characteristics, each core having a common set winding for carrying current pulses that drive said cores toward a first state of saturation and a common reset winding for carrying current pulses that drive each of said cores toward its other state of saturation and a common output winding for each core, said common output winding being wound on one core opposite to the polarity of its winding on the second core whereby the simultaneous switching of each core from the same bistable state to the other stable state will not produce an output signal in said common output winding, but the switching of only one core from a first state of magnetism to the opposite state will produce an output pulse in said common output winding.

2. A logic circuit as defined in claim 1 including sampling winding on only one of said two cores, said sampling winding carrying current pulses that drive its associated core toward said other state of saturation.

3. A logic circuit comprising a pair of bistable magnetic cores having substantially square loop characteristics, each core having a common set winding for carrying signal pulses that drive said cores toward a first state of magnetic saturation and a common reset winding for carrying current pulses that drive each of said cores toward its second state of magnetic saturation and a common output winding for each core, said common output winding being wound on one core opposite to the polarity of its winding on the second core, and a sampling winding on only one of said cores, said sampling winding carrying current pulses that drive its associated core toward its second state of magnetic saturation to produce a positive pulse on said output winding.

4. The logic circuit of claim 3 wherein said reset windings and sampling winding carry current pulses that drive their respective cores toward the second state of magnetic saturation, whereby a negative pulse is produced on said output winding when only one of said cores is switched by current in said reset winding.

5. The logic circuit of claim 3 including a third core, said third core being wound with the same set, reset, and sampling winding on one of said other two cores, a second output winding on said third core and wound opposite from the output winding on said one core that has the sampling winding theeron, whereby the switching of two cores upon the application of a sampling pulse will simultaneously produce a positive pulse on one output winding and a negative pulse on the second output winding.

References Cited in the file of this patent

UNITED STATES PATENTS

| | | |
|---|---|---|
| 2,685,653 | Orr et al. | Aug. 3, 1954 |
| 2,801,344 | Lubkin | July 30, 1957 |
| 2,958,853 | Ridler et al. | Nov. 1, 1960 |
| 2,975,298 | Fawcett et al. | Mar. 14, 1961 |